No. 823,839. PATENTED JUNE 19, 1906.
W. N. WRIGHT & E. CARSON.
TIRE.
APPLICATION FILED APR. 25, 1905.

Witnesses:
Jesse C. Miller.
R. N. Butler.

Inventors.
W. N. WRIGHT &
E. CARSON,
by H. C. Evert &Co.
Attorneys

UNITED STATES PATENT OFFICE.

WILLIAM N. WRIGHT AND ELMER CARSON, OF BEAVER, PENNSYLVANIA.

TIRE.

No. 823,839.   Specification of Letters Patent.   Patented June 19, 1906.

Application filed April 25, 1905. Serial No. 257,379.

*To all whom it may concern:*

Be it known that we, WILLIAM N. WRIGHT and ELMER CARSON, citizens of the United States, residing at Beaver, in the county of Beaver and State of Pennsylvania, have invented a certain new and useful Improvement in Tires; and we do hereby declare the following to be a full, clear, and exact description of the invention, such as will enable others skilled in the art to which it appertains to make and use the same, reference being had to the accompanying drawings, and the figures of reference marked thereon, which form a part of this specification.

This invention has relation to automobile-tires, and has for its object the provision of a tire of novel form and construction and which will not be injured by punctures and will have better wearing qualities than the pneumatic tires ordinarily employed.

A further object of this invention is to provide novel means for preventing tires from slipping in the direction of their rotation and also to prevent them from sliding sidewise.

To accomplish the several above-named objects of our invention and other objects that will be developed in the following description, we make our tire of a large number of circular pieces of suitable material—such as leather, rubber, paper fiber, or the like—such pieces being each in the form of a perforated disk slightly thicker on one side than on the other, and these disks are arranged side by side on a circular core composed of separable sections, and at intervals we arrange bolts or fastening devices of novel form, which serve as shoes or teeth to afford additional gripping qualities to the periphery of the tire and also provide means for the attachment of the tire to the rim of a wheel.

Our invention consists in the novel construction, combination, and arrangement of parts hereinafter described and claimed.

Figure 1:
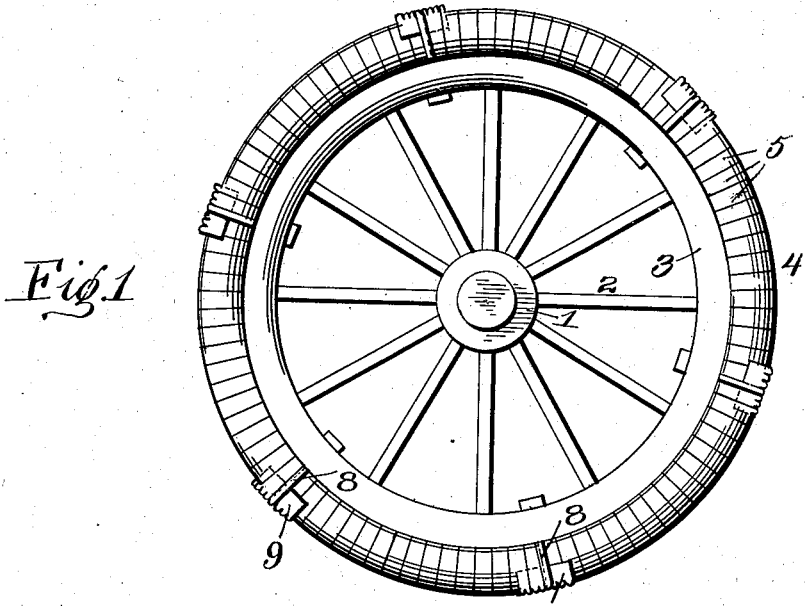
Figure 2:
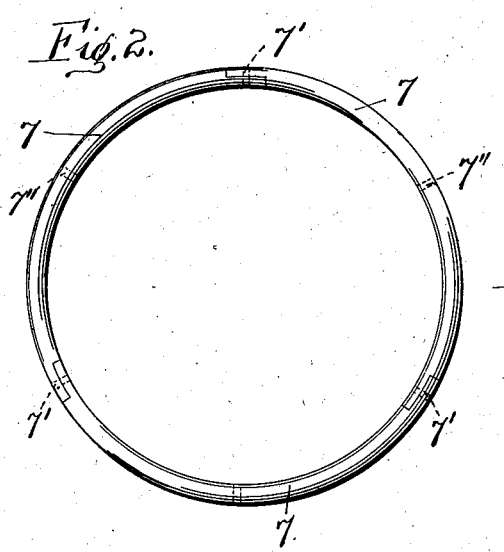
Figure 3:
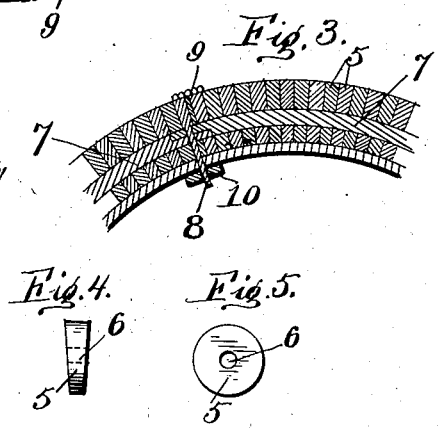
Figure 4:
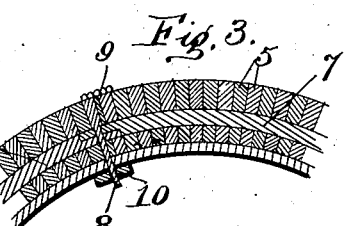
Figure 5:
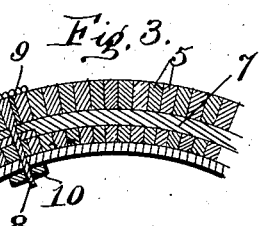
Figure 6:
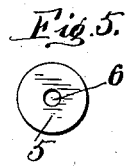

Referring to the accompanying drawings, wherein we have illustrated our improvement, and in the several figures of which corresponding numerals designate like parts, Figure 1 is a side elevation of a wheel provided with a tire constructed according to our improvement. Fig. 2 is a detail side elevation of a metallic core or center that is employed in connection with the tire shown in Fig. 1. Fig. 3 is a fragmentary sectional view of a portion of the tire shown in Fig. 1. Figs. 4 and 5 are an edge view and front view, respectively, of one of the disks of which the body of the tires is composed, and Fig. 6 is a perspective view of one of the bolts which we employ to attach the tire to the rim of the wheel and also to afford additional bearing or gripping surface to the tire.

The wheel shown in Fig. 1 is of conventional form and comprises the hub 1, the spokes 2, and the rim 3, these parts being constructed in the usual or in any desired manner. The tire, which is shown in position on the wheel in Fig. 1 and designated 4, is composed of a number of disks 5, of any appropriate material, such as leather, rubber, paper fiber, or any other material which will possess the requisite wearing qualities. Each of the disks tapers slightly from one edge to the other edge, so that when the disks are arranged side by side around the rim of the wheel each disk will be in complete contact on both sides with the adjacent disks. Each disk is formed with a central opening 6, and a core or band, which is composed of a plurality of sections, each designated 7, is passed through the openings in all the disks and serves, as will be presently described, to hold the disks in proper position upon the rim of the wheel. Each of the sections 7, which sections are composed of steel or iron wire, is provided with a hole 7' at each end and a hole 7'' at the center, and the ends of the sections overlap and are secured together by the fastening-bolts, which are passed through the holes at the ends of the section 7 to secure these sections together.

At intervals throughout the circumference of the tire we arrange bolts 8, these bolts being formed with flattened body portions and being formed at their outer ends each with a Z-shaped bearing shoe or portion 9, that projects slightly beyond the periphery of the tire and is preferably roughened or provided with teeth and constitutes a shoe or tooth, which will afford additional gripping means to the tire and prevent the same from slipping in the direction of its rotation or from sliding sidewise on the surface of the roadway. Each of the bolts 8 extends, as before described, through the holes in the section 7 and extends through the rim and is held in position by a nut 10, that bears on the inner surface of the rim, as shown in Fig. 1.

We claim—

1. In a tire, the combination of a sectional metallic core, a plurality of circular wedge-shaped disks arranged on said core, and bolts arranged at intervals and extending between the disks, said bolts having bearing-surfaces extending beyond the outer surface of the tire, substantially as described.

2. A tire composed of a plurality of circular disks, a central core and a plurality of bolts having substantially Z-shaped outer ends projecting beyond the surface of the adjacent disks.

In testimony whereof we affix our signatures in presence of two witnesses.

WM. N. WRIGHT.
ELMER CARSON.

Witnesses:
JOHN W. HARBISON,
A. T. ANDERSON.